July 14, 1959  H. L. EHLER  2,894,364
CORN HARVESTER AND GATHERING CONVEYOR THEREFOR
Filed Aug. 3, 1956  4 Sheets-Sheet 1
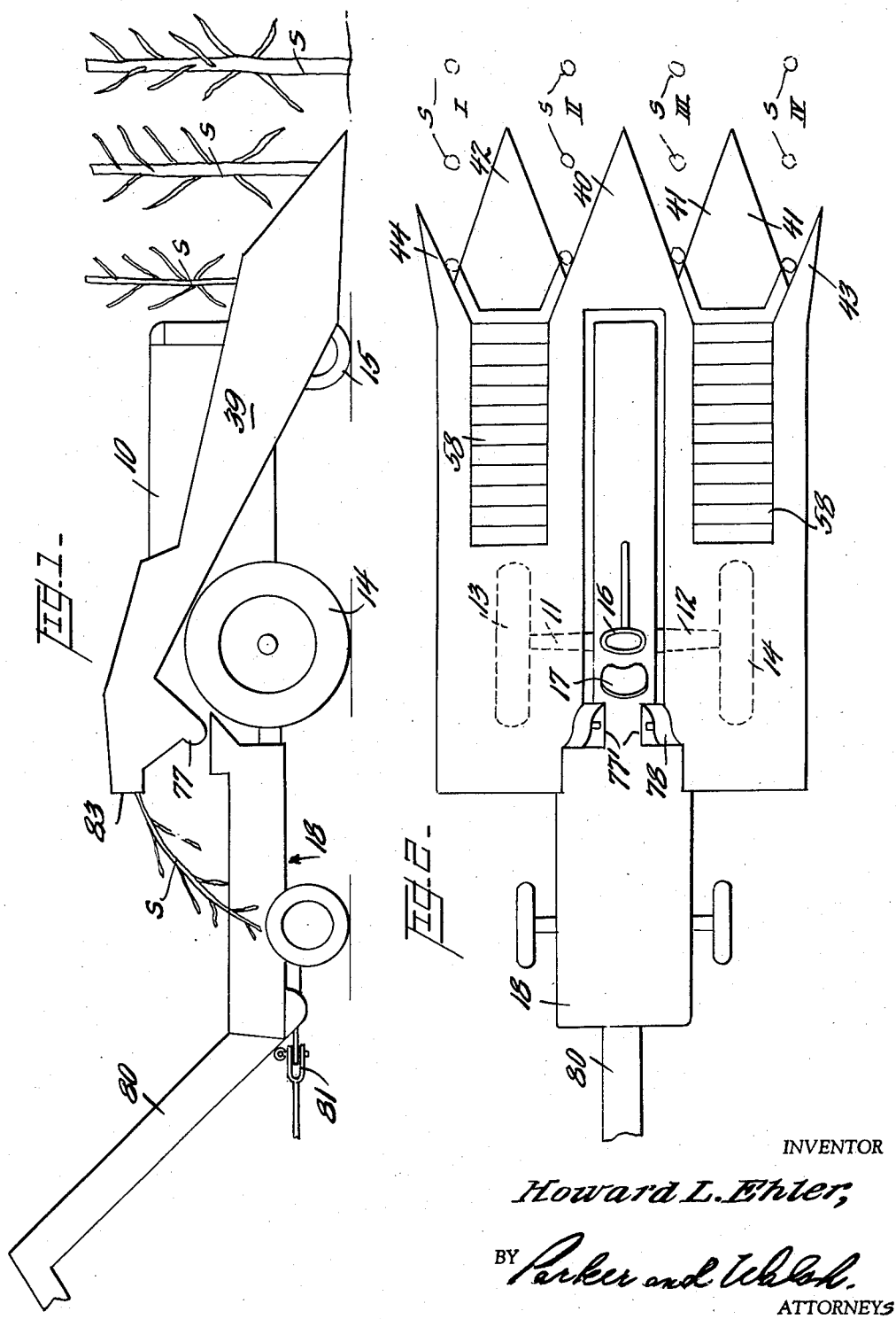
INVENTOR
*Howard L. Ehler,*
BY *Parker and Welsh.*
ATTORNEYS

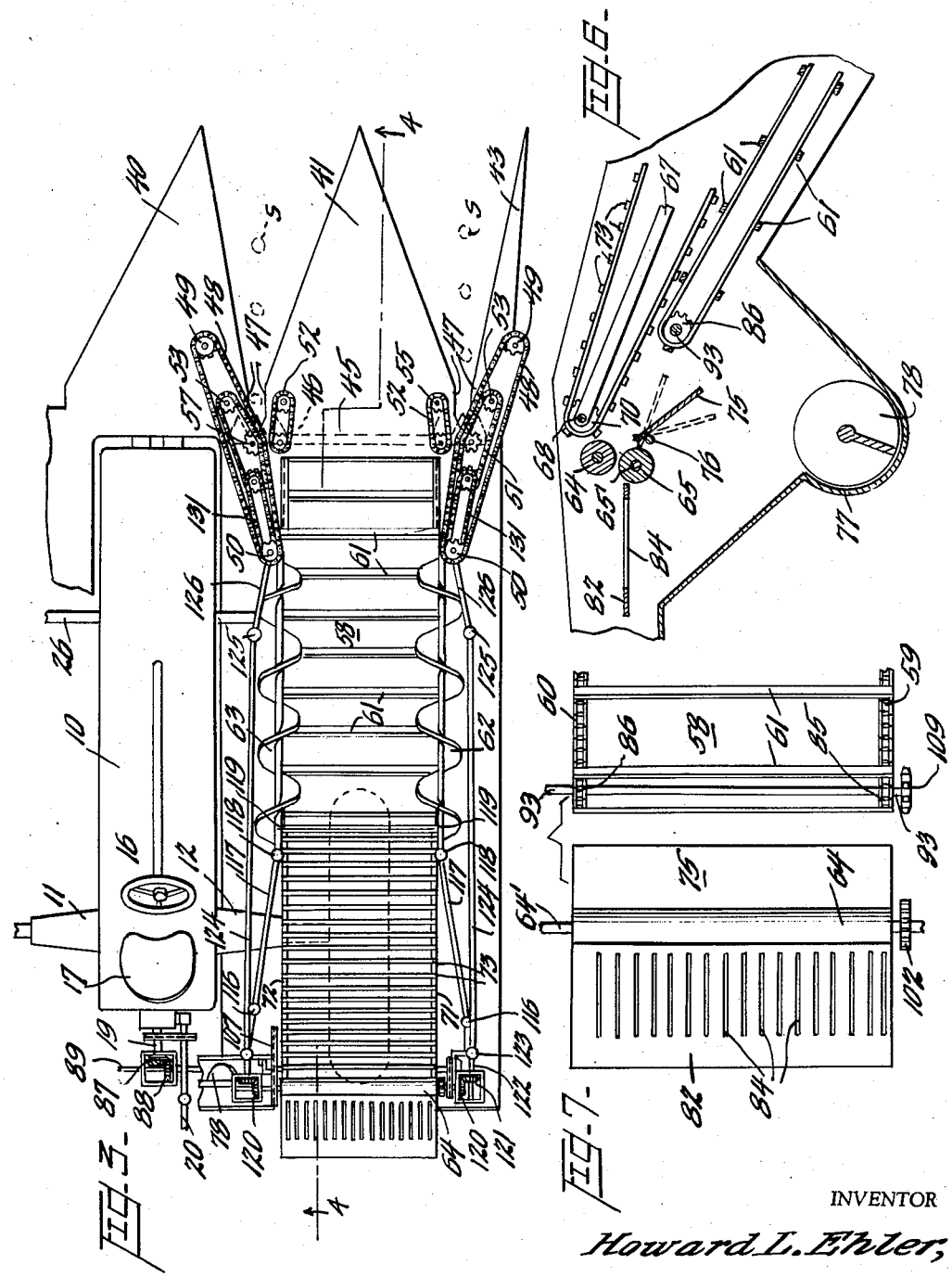

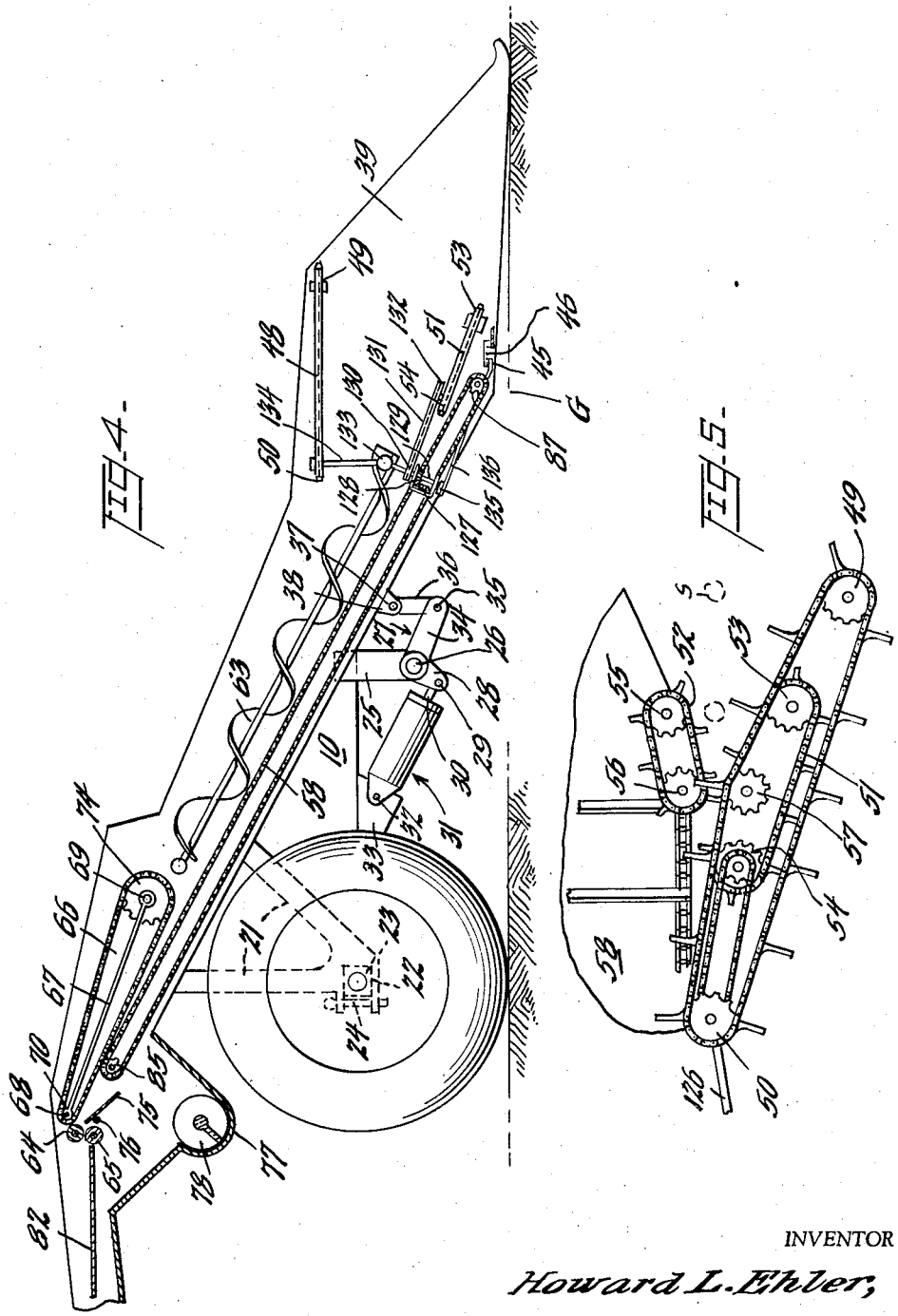

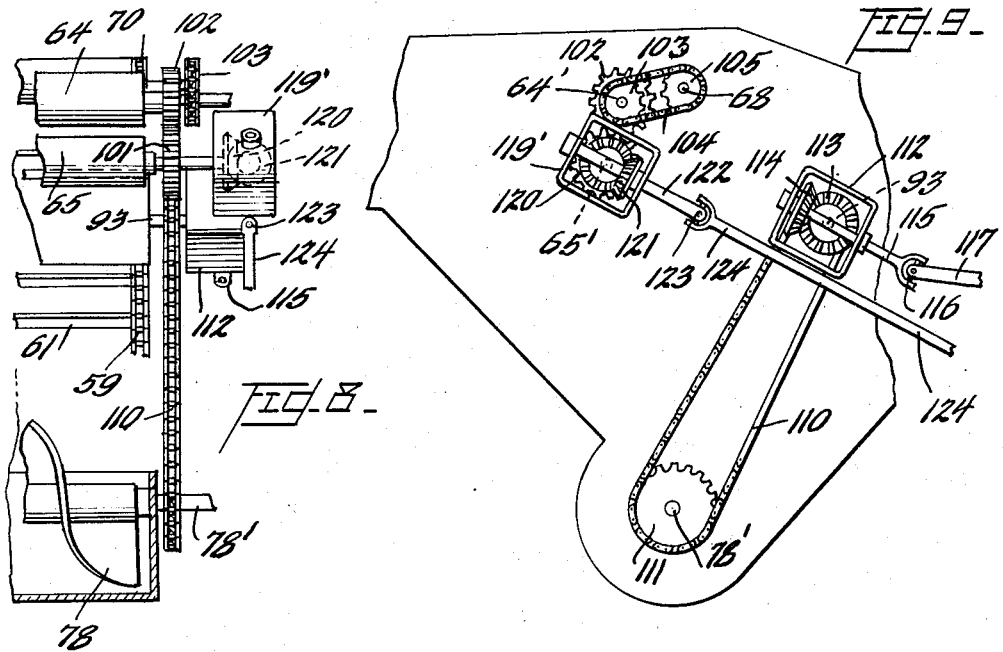
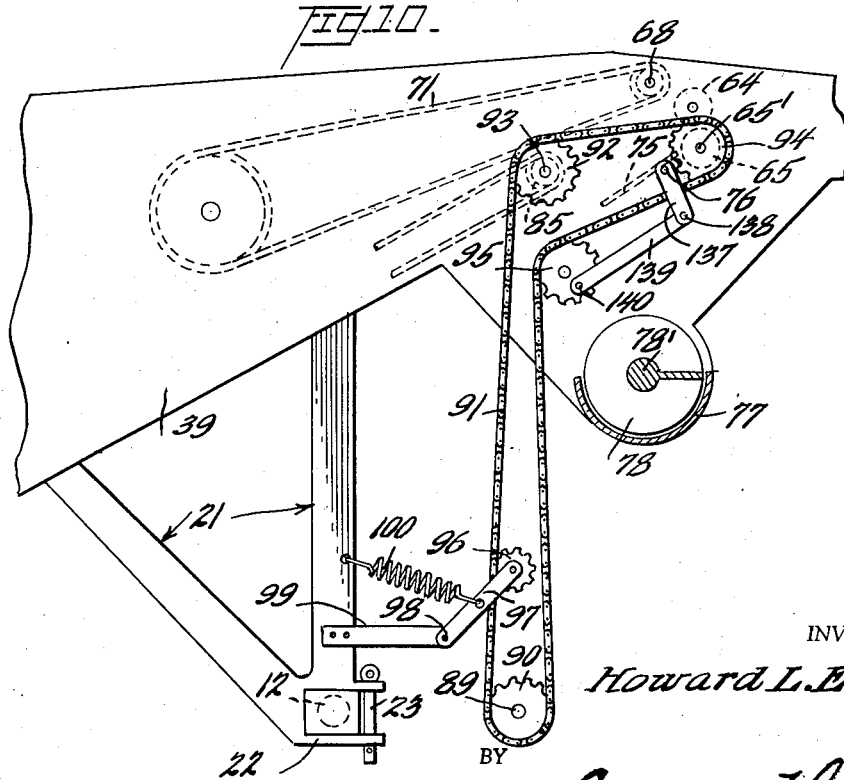

United States Patent Office 2,894,364
Patented July 14, 1959

2,894,364

CORN HARVESTER AND GATHERING CONVEYOR THEREFOR

Howard L. Ehler, Dewey, Ill.

Application August 3, 1956, Serial No. 602,042

13 Claims. (Cl. 56—15)

This invention relates to a corn harvester. More particularly it relates to a corn harvester of the stalk cutter type which may be attached to a row crop tractor to provide motive power for the harvester.

A principal object of this invention is to provide an improved corn harvester of the stalk cutter type.

Another object is the provision of a tractor mounted corn harvester adapted to harvest four rows of corn at a time.

Another object is the provision of a corn harvester which is attachable to and detachable from a conventional row crop tractor.

Another object is the provision of a tractor mounted cutter type corn harvester wherein the severed stalks are delivered, tassel first, upwardly and rearwardly to snapping rolls rearwardly of the rear axle of the tractor.

Another object is the production of a tractor mounted cutter type corn harvester wherein the arrangement of parts results in improved balance.

The above and other objects will be apparent from the following detailed description taken with the accompanying drawings wherein like characters of reference represent like parts throughout the several figures.

In the drawings:

Figure 1 represents a side view of the corn harvester of this invention coupled to a conventional corn husking machine;

Figure 2 is a plan view of the device of Figure 1;

Figure 3 is a plan view of the corn harvester of this invention with certain parts omitted;

Figure 4 is a section substantially along the line 4—4 of Figure 3;

Figure 5 is an enlarged fragmentary plan view of the cutting and gathering end of the harvester;

Figure 6 is an enlarged fragmentary sectional view of the snapping rolls and the feed thereto;

Figure 7 is a fragmentary plan view of a portion of the device as shown in Figure 6 with parts removed;

Figure 8 is a fragmentary plan view, on an enlarged scale, of the drive for the ear conveyor and the snapping rolls;

Figure 9 is a side view of the elements shown in Figure 8; and

Figure 10 shows the driving connection from the tractor power take-off to the main conveyor and snapping rolls.

A corn harvester according to the invention includes a conventional tractor 10 having extended rear axle structures 11, 12, with rear driving wheels 13, 14; and a front steerable wheel or wheels 15; a steering wheel 16 and an operator's station 17. A conventional husking machine 18 is suitably coupled to the tractor and is driven by the power take-off 19, by means of a suitable shaft 20.

The harvesting machine of this invention includes two like units allochirally arranged on either side of the tractor 10 as shown in Figure 2, so that but one such machine is illustrated and described; that one the one on the right hand side of the tractor as shown in Figure 3. The corn harvester includes a rear frame 21 having a clevis 22 engaged over a block 23, mounted on the axle 12 and fastened by a pin 24.

A bracket 25 supports one end of a shaft 26 (the opposite end thereof being supported in a similar bracket on the opposite side of the machine), as shown in Figure 4. A pair of bell cranks, one being shown at 27, are mounted on the shaft 26 to rotate same. An arm 28 of the bell crank 27 is pivoted as at 29 to the piston rod 30 of a hydraulic means 31. The hydraulic means 31 is pivoted as at 32 on a bracket 33 on the tractor 10. The other arm 34 of the bell crank 27 is pivoted at 35 on a link 36, which is pivoted on a pin 37 mounted in a bracket 38 on the frame 39. By means of the hydraulic means 31 and the bell crank 27, the harvester can be pivoted about the axle 12 to arrange the gathering and cutting portions at a suitable elevation above the ground level G as will later appear.

The frame 39, preferably fabricated of suitable sheet metal comprises several enclosures for operating parts, and may include other suitable strengthening and supporting members, not shown. Such other members may be employed in any desired manner to produce a structure having the desired strength and rigidity.

The forward portion of the frame structure 39 of harvester, as shown in Figure 2, includes a plurality of row dividers; a divider 40 in front of and about the steerable wheel 15, a divider 41 at the right side and a divider 42 at the left side. Also there is a gathering arm 43 at the extreme right side and a gathering arm 44 at the extreme left side as shown in Figure 2. The divider 42 and the gathering arm 44 will pass along row I of corn stalks S, the same divider 42 and the divider 40 passing along the row II; the divider 40 and the divider 41 pass along row III, while the divider 41 and the gathering arm 43 pass along the row IV, all to bring the stalks S into the cutting and conveying means.

As shown in Figure 2, the cutting and conveying means includes a sickle bar 45 having blades 46 in the path of the corn stalks S in each of the rows I, II, III and IV. The several gathering and dividing means 40 to 44 are arranged with sides that taper rearwardly to a point adjacent the cutting means, and form gaps or throats 47. Gathering chains 48 (Figures 4 and 5), one for each row of corn, engage the stalks S a considerable distance above the ground just prior to engagement thereof by the cutter blades 46. Each chain 48 is supported on sprockets 49 and 50, sprocket 50 being driven as will later appear. Sprockets 49 and 50 are mounted in suitable bearings, not shown, in the frame structure 39. Gathering chains 51 and 52 engage the stalks S just above the cutting point and just before the stalks S reach the cutter bar 45. Gathering chain 51 is mounted on sprockets 53 and 54. Gathering chain 52 is mounted on sprockets 55 and 56. The sprockets 53, 55 and 56 are mounted in suitable bearings, not shown, on the frame structure 39. Idler sprockets 57 are used with gathering chains 48 to change the direction thereof slightly, just before they approach the conveying means, later to be described.

The gathering chain 48 is driven at a somewhat greater rate than the chains 51 and 52 to cause the stalks S to move tassel end first toward the endless conveyor 58. The conveyor includes chains 59 and 60 and widely spaced slats 61. A pair of screw conveyors 62 and 63 are provided at the edges of the conveyor 58 to keep the stalks on the conveyor 58. The conveyor 58 travels upwardly and rearwardly from the feeding and gathering chains 48, 51 and 52, toward a pair of snapping rolls 64, 65 located slightly above and to the rear of the operator's station.

Near the upper end of the conveyor 58 there is a floating conveyor 66 (Figures 3 and 4) comprising an arm 67 pivoted at one end about the axis of a shaft 68, and carrying at its free end a shaft 69. A pair of spaced sprockets, one, 70, being shown, on the shaft 68 drive chains 71 and 72 having spaced slats 73. The chains 71 and 72 pass over a pair of sprockets, one, 74, being shown, on the shaft 69. The free end of the floating conveyor 66 bears on corn stalks being fed upwardly by the conveyor 58 and guides them to the snapping rolls 64, 65 which remove the ears of corn. From the snapping rolls 64, 65 the ears of corn drop on a plate 75, movably mounted on a pivot 76 below and forwardly of the snapping rolls. The ears of corn then drop into the trough 77. In the trough 77 there is a screw conveyor 78, which directs the ears of corn toward a discharge opening approximately along the axis of the tractor, and from which they are discharged into the corn husker 18.

The husked ears are carried upwardly and rearwardly by a conveyor 80 and suitably disposed of, preferably by dropping into a wagon drawn by the hitch 81, as is well known.

The stalks S are driven upwardly by the conveyor 66 and the snapping rolls 64, 65 over a table 82 (Figures 6 and 7) and are discharged through an opening 83. The table 82 is provided with one or more openings 84 to permit any shelled corn to drop into the trough 77.

Sprocket chains 59 and 60 pass over driven sprockets 85 and 86 (Figure 7) and a pair of idler sprockets, only one, 87, being shown (Figure 4).

The drive for the mechanism thus far described is taken from the power take-off shaft 19 (Figure 3) through bevel gears 87, 88 to a transverse shaft 89. The shaft 89 (Figure 10) traverses the rear of the harvesting means behind the tractor, and carries a sprocket 90 which drives a chain 91. The chain 91 passes over a sprocket 92, which drives conveyor 58, said sprocket 92 being mounted on a shaft 93, and a sprocket 94 on a shaft 65' carrying the roller 65; thence around an idler sprocket 95 back to the sprocket 90. A chain tension sprocket 96 is mounted on the arm 97 pivoted at 98 on the bracket 99 and is urged toward the chain 91 by a spring 100. A gear 101 (Figure 8) on one end of the shaft 65' meshes with a gear 102 on a shaft 64' carrying the snapping roller 64. Also on the shaft 64' there is a sprocket 103 (Figure 9) over which a chain 104 passes to drive a sprocket 105 on the shaft 68 for driving the floating conveyor 66. The shaft 93 (Figures 8 and 9) carries a sprocket 109 (Figure 7) over which a chain 110 passes to the sprocket 111 on the shaft 78' of the conveyor 78 (Figure 9).

On either end of the shaft 93 (Figures 8 and 9) there is a casing 112 having a bevel gear 113 mounted on the shaft 93 and a bevel gear 114 meshing with the gear 113 to drive a stub shaft 115. The stub shaft 115 is connected by a universal joint 116 (Figure 3) to a shaft 117. The shafts 117 are connected by universal joints 118 to shafts 119, on which the conveyors 62 and 63 are mounted.

At either end of the shaft 65' there is a housing 119' (Figures 8 and 9) having a bevel gear 120 mounted on the shaft 65' which meshes with a bevel gear 121 mounted on the stub shaft 122. The stub shaft 122 is connected by a universal joint 123 (Figures 3 and 4) to a shaft 124. Another universal joint 125 connects the shaft 124 with a shaft 126 on which bevel gear 127 is mounted. The bevel gear 127 meshes with a bevel gear 128 mounted on a shaft 129. The shaft 129 carries a sprocket 130 over which a chain 131 is trained to drive a sprocket 132 co-axial with and fixed to sprocket 54 to drive the gathering chain 51.

Also on the shaft 129 there is a universal joint 133 (Figure 4) connected to a shaft 134 carrying the sprocket 50 for driving the forwarding chain 48. Also on the shaft 129 there is a crank 135 connected by a pitman 136 to the cutter bar 45 for operating same.

The plate 75 (Figure 10) is mounted on the pivot 76 which carries the arm 137 pivoted at 138 to a link 139 having an opening 140 adapted to receive a suitable pin or the like to adjust the plate 75.

In operation, the frame 39, carrying the present corn harvesting means is mounted on a suitable row crop tractor 10. The several cutting means 45 are aligned with rows I, II, III and IV and the power take-off is engaged to drive the shaft 19. The various elements are driven by the drive means just described and the gathering conveyor chains 48 draw the upper portions of the stalks S toward the machine. As the lower portions are cut by the bar 45 and fed toward the conveyor 58 by the feeding means 51, 52, the stalks S, due to the faster movement of the conveyor 48 lean back toward the conveyor 58. As the stalks drop onto the conveyor 58 they are kept in line and retained on the conveyor 58 by the two screw conveyors 62 and 63. Near the upper end of the conveyor 58 the floating conveyor 66 exerts its gravitational pressure on the corn stalks and assists in feeding them to the snapping rolls 64 and 65. The snapping rolls remove ears of corn and feed the stalks rearwardly to be ejected at the outlet 83. The ears of corn drop over the plate 75 into the trough 77 to be moved toward the discharge 77' by a conveyor 78.

In the above description a single harvesting means, for two rows of corn, has been detailed. In the present instance the machine comprises two such devices embodied in a single shell 39, allochirally arranged with respect to the longitudinal axis of the tractor.

Having described a preferred form of a corn harvester I desire it to be understood that modifications may be made in details within the scope of the appended claims.

I claim:

1. In a corn harvester adapted to be supported on a row crop tractor having a power take off, a frame structure, means for attaching the frame structure to a tractor to be powered thereby; a pair of harvesting means mounted in said frame structure and at the sides of said tractor, each harvesting means including a plurality of divider means, a plurality of cutting means, said dividers and cutters being located forwardly and at a low stalk-engaging position on the frame, a plurality of gathering means mounted forwardly on the frame, an endless conveyor extending upwardly and rearwardly from the cutting means, screw conveyors extending along the longitudinal edges of the endless conveyor, a floating conveyor adjacent and overlying the upper rear portion of the endless conveyor arranged with its forward portion floating, snapping rolls adjacent the upper end of the endless conveyor, a trough below the snapping rolls, a deflector plate forwardly of and below the snapping rolls to receive ears of corn and discharge them into the trough, conveying means in the trough receiving the snapped ears and conveying them to a discharge portion; and drive means adapted to be connected to the tractor power take-off for driving the gathering chains, the cutting means, the conveying means and the snapping rolls.

2. In a corn harvester adapted to be supported on a row crop tractor having a power take off, a frame structure, means for attaching the frame structure to a tractor to be powered thereby; a pair of harvesting means mounted in said frame structure and at the sides of said tractor, each harvesting means including a plurality of divider means, a plurality of cutting means, said dividers and cutters being located forwardly and at a low stalk-engaging position on the frame, a plurality of gathering means mounted forwardly on the frame, an endless conveyor extending upwardly and rearwardly from the cutting means, a floating conveyor adjacent and overlying the upper rear portion of the endless conveyor arranged with its forward portion floating, snapping rolls adjacent the upper end of the endless conveyor, a trough below the snapping rolls, a deflector plate forwardly of and below the snapping rolls to receive ears of corn and discharge them into the trough, conveying means in the trough receiving the snapped ears and conveying them to a discharge portion; and drive means adapted to be connected to the tractor power take-off for driving the gathering chains, the cutting means, the conveying means and the snapping rolls.

3. In a corn harvester adapted to be supported on and driven by a row crop tractor having a frame, rear driving wheels, front steerable wheels, a power take-off and an operator's station between the driving wheels; said harvester having a frame structure having means for attachment alongside and at both sides of the tractor; a pair of harvesting means mounted in said frame structure, each harvesting means including a plurality of stalk dividers, a plurality of stalk cutting means, said dividers and cutters being located forwardly and at a low, stalk-engaging position on the frame, gathering conveyor means for each stalk cutting means, located above and at each side thereof an endless conveyor arranged adjacent the stalk cutting means and extending upwardly and rearwardly to a point substantially opposite the operator's station, stalk-arranging conveyors at the longitudinal edges of the endless conveyor, an endless floating conveyor adjacent and overlying the upper rear portion of the endless conveyor, ear snapping rolls adjacent the upper end of the endless conveyor above and rearwardly of the operator's station, the forward end of the floating conveyor floating above the endless conveyor, and the rear end thereof being pivoted rearwardly of and above the endless conveyor adjacent the ear snapping rolls, a trough below the snapping rolls, conveyor means in the trough receiving ears of corn and directing them to a discharge; the ear conveying means of each harvesting means moving ears of corn toward the other such ear conveying means and drive means for connecting the power take off to said cutters, said conveyors and said snapping rolls.

4. The device according to claim 3, wherein the frame is pivotally mounted on a tractor drive axle, and wherein adjusting means are provided to vary the vertical position of the forward portions of the harvesters.

5. The device according to claim 4, wherein the adjusting means includes a hydraulic cylinder.

6. The device according to claim 3 including a vibrating pivoted deflector plate below the snapping rolls.

7. The structure according to claim 3, wherein the gathering conveyor means includes longitudinally travelling chains at each side of the endless conveyor, one such chain on each side above another chain on the same side, each upper chain travelling faster than the corresponding lower chain to lean the tassel ends of the stalks rearwardly toward the endless conveyor.

8. The device according to claim 7, wherein the lower chain has an opposed chain with one of the cutting means arranged between said opposed lower chains.

9. In a corn harvester adapted to be supported on a row crop tractor having a power take off, a frame structure, means for attaching the frame structure to a tractor to be powered thereby; a pair of harvesting means mounted in said frame structure and at the sides of said tractor, each harvesting means including at the forward part thereof, at least one row divider and sharing an additional row divider with the other harvesting means, a plurality of cutters mounted in a forward, low, stalk-engaging position in said frame, a plurality of gathering devices on said frame, at least partially to the rear of the dividers, an endless conveyor extending upwardly and rearwardly from the cutting means, a floating conveyor adjacent and overlying the upper rear portion of the endless conveyor arranged with its forward portion floating, snapping rolls adjacent the upper end of the endless conveyor, a trough below the snapping rolls, a deflector plate forwardly of and below the snapping rolls to receive ears of corn and discharge them into the trough, conveying means in the trough receiving the snapped ears and conveying them to a discharge portion; and drive means adapted to be connected to the tractor power take-off for driving the gathering chains, the cutting means, the conveying means and the snapping rolls.

10. In a corn harvester of the stalk-cutter and snapping roll type wherein the cut stalks are conveyed upwardly and rearwardly to the snapping rolls, a frame supporting the cutter at a low, forward position and the snapping rolls at a higher, rearward position, first means mounted on said frame in advance of the rolls for confining the upward movement of the stalks and guiding them into the bight of the rolls and additional means mounted on said frame below said first means for exerting a reciprocating upward force upon the stalks against the confining action of the guide means.

11. The combination of claim 10 wherein the reciprocating means is a plate elongated in a direction parallel with the axis of the rolls and pivoted along its rear edge for oscillation thereabout.

12. In a corn harvester of the stalk-cutter type having a frame wherein the stalks are conveyed rearwardly of the cutting zone by a horizontally moving endless conveyor mounted on said frame and wherein a throat-like structure mounted in advance of the conveyor guides the stalks toward the cutter mounted in the throat in advance of the forward turning radius of the conveyor, at least two, vertically spaced, fingered gathering chains mounted on each side of the throat structure, the uppermost chain extending forwardly of the lowermost chain and means for driving the chains at differential speeds, the uppermost, at the highest rate, whereby the stalks are tipped backward to fall upon the conveyor, butt forward.

13. The combination of claim 12 wherein the corresponding fingers on the chains opposite each other extend only part of the width of the conveyor toward each other and wherein the rearward turning radii of the chains overlap only a short distance the forward turning radius of the conveyor, whereby the stalks may spread out upon the conveyor.

References Cited in the file of this patent

UNITED STATES PATENTS

| | | |
|---|---|---|
| 690,841 | Degenhard | Jan. 7, 1902 |
| 2,513,941 | Hyman | July 4, 1950 |
| 2,517,401 | Millard et al. | Aug. 1, 1950 |
| 2,527,823 | Karlsson et al. | Oct. 31, 1950 |
| 2,669,823 | Kramer | Feb. 23, 1954 |